(12) United States Patent
McRorie, III (10) Patent No.: US 10,004,327 B2
(45) Date of Patent: Jun. 26, 2018

(54) CONVERTIBLE SIT AND STAND WORKSTATION

(71) Applicant: Perfect Posture LLC, Norcross, GA (US)

(72) Inventor: Robert Grant McRorie, III, Huntersville, NC (US)

(73) Assignee: PERFECT POSTURE LLC, Norcross, GA (US)

( * ) Notice: Subject to any disclaimer, the term of this patent is extended or adjusted under 35 U.S.C. 154(b) by 73 days.

(21) Appl. No.: 15/212,740

(22) Filed: Jul. 18, 2016

(65) Prior Publication Data

US 2017/0013957 A1   Jan. 19, 2017

Related U.S. Application Data

(60) Provisional application No. 62/194,150, filed on Jul. 17, 2015.

(51) Int. Cl.

| A47B 21/02 | (2006.01) |
|---|---|
| A47B 9/14 | (2006.01) |
| A47B 9/02 | (2006.01) |
| F16M 11/24 | (2006.01) |
| A47B 9/20 | (2006.01) |
| A47B 21/03 | (2006.01) |

(52) U.S. Cl.
CPC ............... *A47B 21/02* (2013.01); *A47B 9/02* (2013.01); *A47B 9/14* (2013.01); *F16M 11/24* (2013.01); *A47B 9/20* (2013.01); *A47B 2021/0364* (2013.01); *A47B 2200/0023* (2013.01); *A47B 2200/0054* (2013.01); *A47B 2200/0076* (2013.01)

(58) Field of Classification Search
CPC ........... A47B 21/00; A47B 2200/0066; A47B 2200/0051; A47B 9/02; A47B 9/14
USPC .... 108/50.01, 50.02, 144, 147, 146, 147.19, 108/144.11
See application file for complete search history.

(56) References Cited

U.S. PATENT DOCUMENTS

| 3,854,428 | A | * | 12/1974 | Fullenkamp | ............. | A47B 9/00 108/136 |
|---|---|---|---|---|---|---|
| 4,026,222 | A | * | 5/1977 | Mueller | ................... | A47B 9/14 108/146 |
| 4,607,577 | A | * | 8/1986 | Leonardo | ................ | A47B 9/083 108/146 |
| 5,174,223 | A | * | 12/1992 | Nagy | ..................... | A47B 21/00 108/50.01 |
| 5,190,302 | A | * | 3/1993 | Trotta | ...................... | A47B 9/20 |

(Continued)

*Primary Examiner* — Jose V Chen
(74) *Attorney, Agent, or Firm* — Trego, Hines & Ladenheim, PLLC; Thomas McClure; Jonathan Hines (57) ABSTRACT

A workstation for alternatively configuring a conventional desk for use while sitting and use while standing. The workstation includes an extendable column formed of multiple nested sections. The nested sections are configured to telescope such that the column can be extended. The workstation is configured to support a monitor and a tray. The extendable column contains a counter balance mechanism that is configured to resist collapsing of the column. A movement coupling mechanism is provided that it is such that motion of the first section relative to the second section is transmitted to the third section such that the third section moves a corresponding amount relative to the second section.

4 Claims, 11 Drawing Sheets

(56) References Cited

U.S. PATENT DOCUMENTS

| | | | | |
|---|---|---|---|---|
| 5,289,782 A * | 3/1994 | Rizzi | A47B 9/02 | 108/146 |
| 5,884,882 A * | 3/1999 | Nada | A47B 21/00 | 108/147 |
| 6,418,860 B1 * | 7/2002 | Hinderhofer | A47B 21/03 | 108/10 |
| 6,493,220 B1 * | 12/2002 | Clark | A47B 21/00 | 248/918 |
| 6,832,560 B2 * | 12/2004 | Seiler | A47B 21/00 | 108/50.01 |
| 7,612,999 B2 * | 11/2009 | Clark | A61B 5/0002 | 248/918 |
| 7,621,544 B2 * | 11/2009 | Rossini | A47B 21/00 | 280/47.34 |
| 7,677,518 B2 * | 3/2010 | Chouinard | A47B 21/02 | 108/10 |
| 8,109,527 B2 * | 2/2012 | Bustle | A61G 12/001 | 248/118.3 |
| 8,180,485 B2 * | 5/2012 | Reckelhoff | A61G 12/001 | 700/242 |
| 9,271,569 B2 * | 3/2016 | Zaccai | A47B 83/045 | |
| 9,775,431 B2 * | 10/2017 | Abernethy | A47B 21/04 | |
| 2003/0142468 A1 * | 7/2003 | Chin | A47B 9/14 | 361/679.02 |
| 2007/0227409 A1 * | 10/2007 | Chu | A47B 21/00 | 108/50.02 |
| 2010/0019548 A1 * | 1/2010 | Tajbakhsh | A47B 21/00 | 297/162 |
| 2010/0213679 A1 * | 8/2010 | Smith | A47B 21/00 | 280/47.35 |
| 2014/0360415 A1 * | 12/2014 | Riis | A47B 9/20 | 108/147.19 |
| 2015/0164218 A1 * | 6/2015 | Bonuccelli | A47B 9/20 | 108/147.19 |
| 2015/0285430 A1 * | 10/2015 | Wang | A47B 9/04 | 248/188.5 |
| 2016/0037907 A1 * | 2/2016 | Ergun | A47B 9/12 | 108/147 |
| 2016/0367023 A1 * | 12/2016 | Toedtman | A47B 9/02 | |
| 2017/0135587 A1 * | 5/2017 | Desroches | A47B 9/20 | |

* cited by examiner

CONVERTIBLE SIT AND STAND WORKSTATION

FIELD OF THE INVENTION

The invention relates generally to adjustable mechanisms for workstations and more specifically to a workstation configured to be adjustable such that in a first position it facilitates work while the user is sitting and in a second position it facilitates work while the user is standing.

BACKGROUND OF THE INVENTION

Conventional computer workstations that are intended to be sat at and desks for standing at are known. In some workplace situations such as "hoteling," or office sharing, different people work at the same workstation. One problem with such a situation is that some people prefer to stand while working at a computer while some prefer to sit. Furthermore, some people prefer to work at a computer while standing some parts of the day and sitting other parts of the day. For some, these periods of sitting and periods of standing while working can be alternated multiple times during a day.

A problem with conventional workstations and desks is that they cannot be easily worked at by someone standing.

Another problem with conventional workstations is that they cannot be easily converted between a seated configuration and a standing configuration.

A problem with conventional standing desks is that they are not configured to operate in tandem with a conventional desk.

Another problem with conventional standing desks is that they can be complicated and expensive to manufacture.

SUMMARY OF THE INVENTION

The present invention addresses the foregoing problems by providing a convertible workstation having a first position configured to accommodate a sitting user and a second position configured to accommodate a standing user. More specifically, the present invention provides an extendable column configured to be supported by a conventional desktop surface. The column has a keyboard tray attached to it for supporting a keyboard and includes a bracket for attaching a monitor. A sliding auxiliary tray that defines a work surface is provided such that the position of the work surface can be adjusted laterally relative to the column. The work surface can be positioned over the keyboard tray. The height of the platform relative to the desktop surface can be adjusted by extending or retracting the column. In this manner, the platform can be moved between a height suitable for a standing user and a height suitable for a sitting user. In a preferred embodiment, the column includes three sections that are nested together. The sections are operably connected such that movement of a third section relative to a second, middle, section causes movement of the first section. Likewise, movement of the first section relative to the second section causes movement of the third section.

According to one embodiment of the present invention there is provided a workstation for alternatively configuring a conventional desk for use while sitting and use while standing. The workstation includes an extendable column formed of multiple nested sections. The nested sections are configured to telescope such that the column can be extended. The workstation is configured to support a monitor and a tray. Extendable column contains a counter balance mechanism that is configured to resist collapsing of the column. A movement synchronization mechanism is provided that it is such that motion of the first section relative to the second section is transmitted to the third section such that the third section moves a corresponding amount relative to the second section.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF THE PREFERRED EMBODIMENTS

Figure 1A:
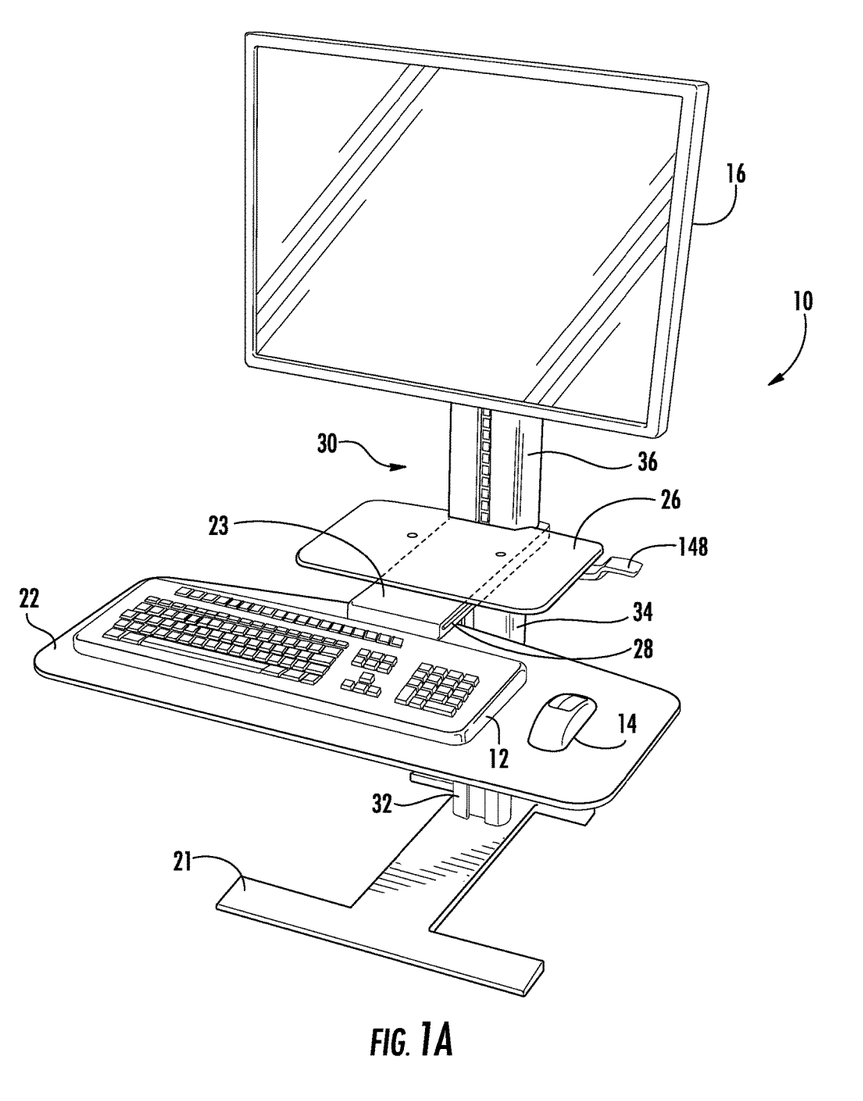
FIG. 1A shows a front perspective view of an extendable workstation according to the present invention that includes an extendable column and an auxiliary tray wherein the auxiliary tray is in a first position.
Figure 1B:
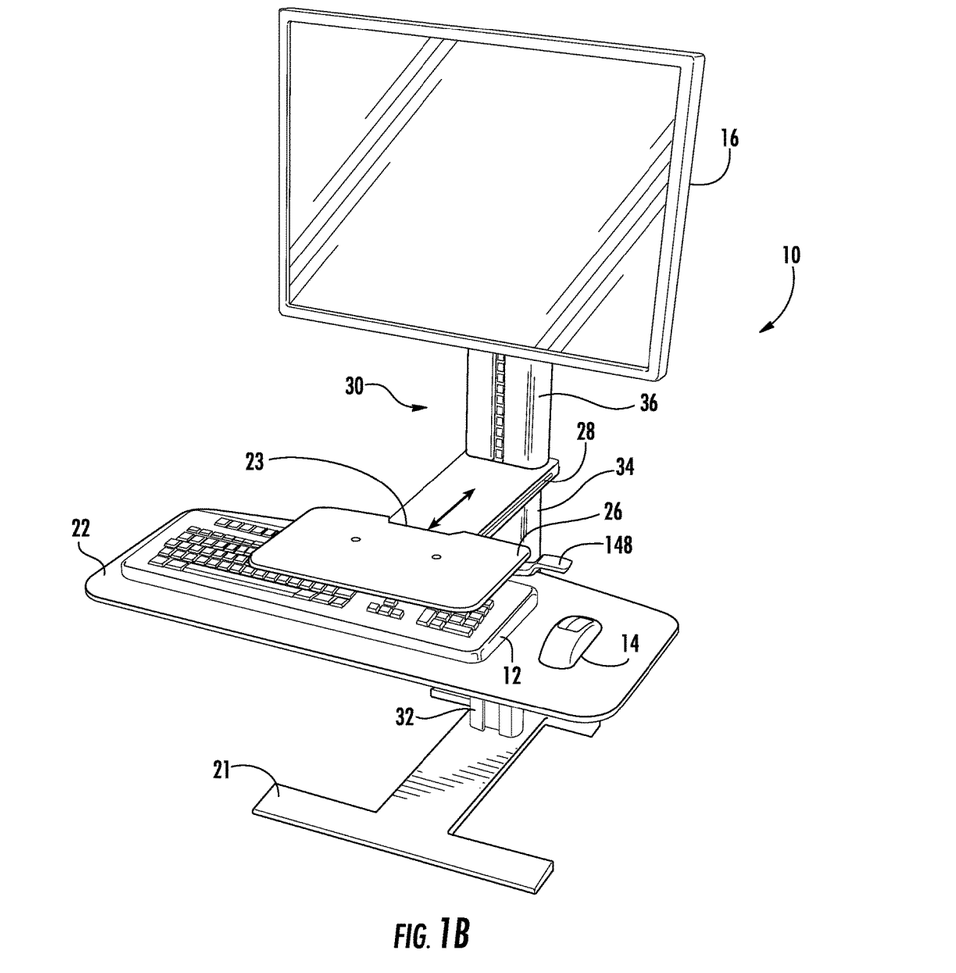
FIG. 1B shows the workstation in FIG. 1 wherein the auxiliary tray is in a second position.

Referring now to FIG. 1, the present invention is directed to an apparatus, i.e., a workstation 10, configured to be used as a desk and/or a computer stand. Workstation 10 is convertible between a first mode configured to accommodate a seated user and a second mode configured to accommodate a standing user. It should be appreciated that workstation 10 can be adjusted to provide a keyboard tray for supporting a keyboard that is positioned for use by persons of different stature that are sitting or standing. For example, workstation 10 can be adjusted to be used by a taller person who is seated, a shorter person who is seated, a taller person standing, and a shorter person standing.

Figure 2:
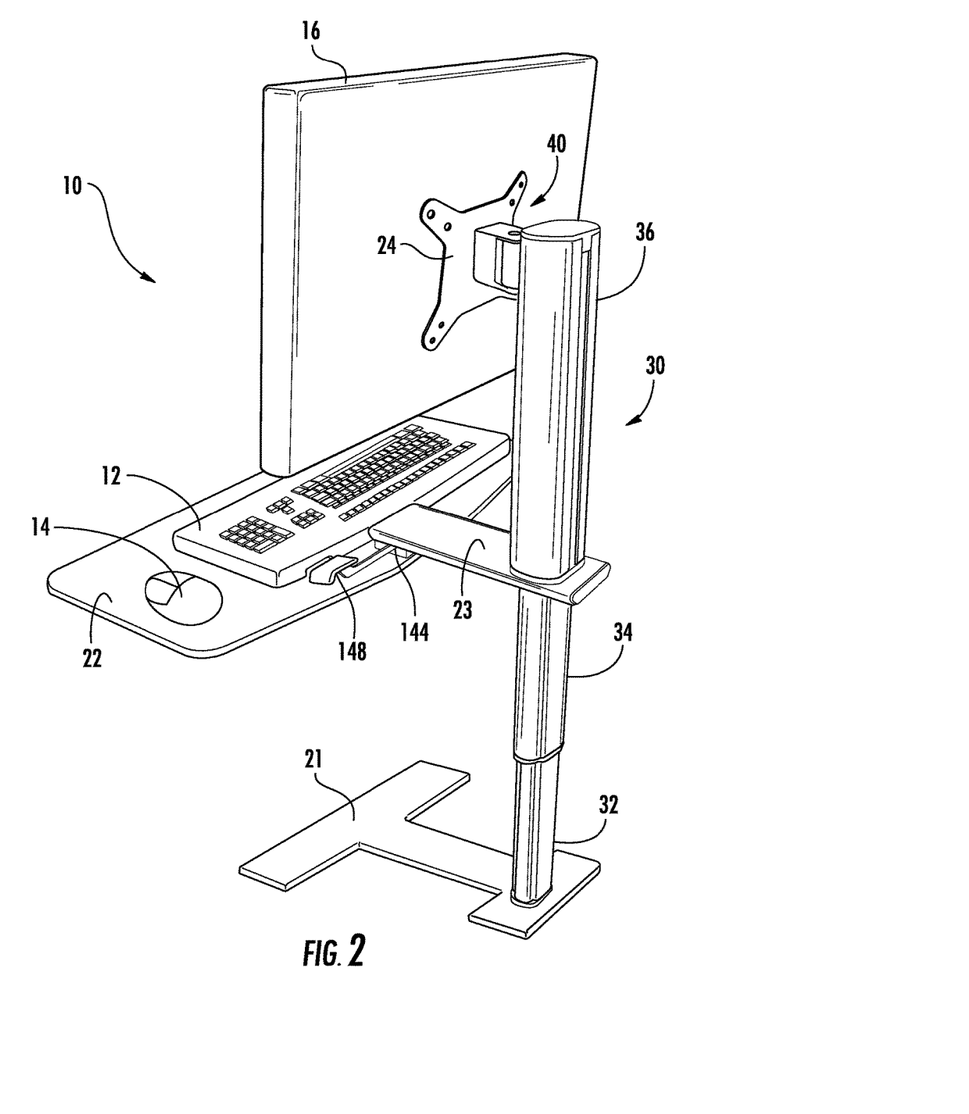
FIG. 2 shows a rear perspective view of the workstation of FIG. 1, without an auxiliary tray.
Figure 3:
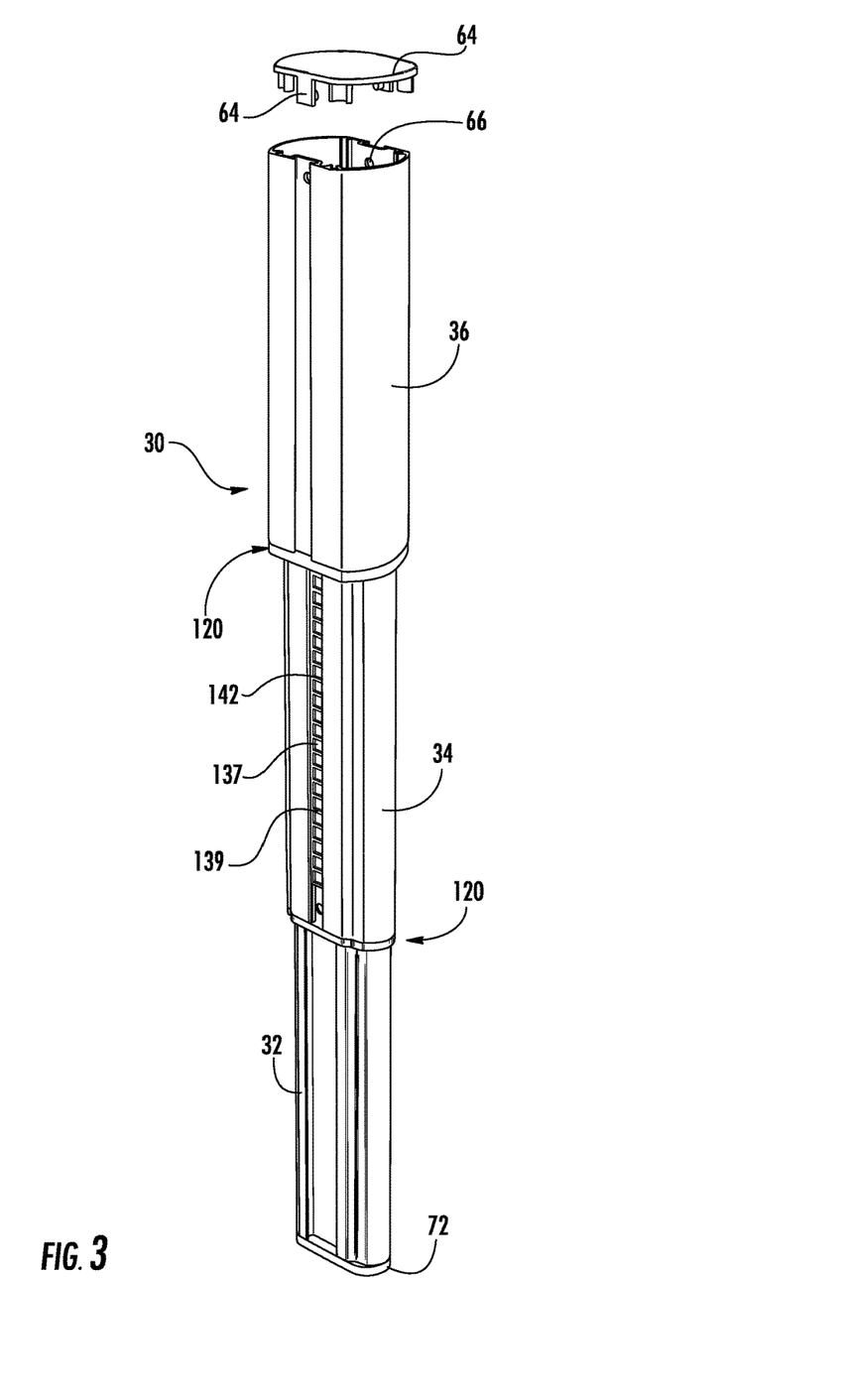
FIG. 3 shows a perspective view of the extendable column of the workstation shown in FIG. 1.

Referring now to FIGS. 1 and 2, workstation 10 includes an extendable column 30, a base 21, a keyboard tray 22, and a monitor bracket 24 (see FIG. 3). The keyboard tray 22 is configured to support a keyboard 12 and a mouse 14. The monitor bracket 24 is configured to support a monitor 16. According to the illustrated embodiment, column 30 includes 3 nested sections: a first nested section 32, a second nested section 34, and a third nested section 36. The first section of column 30 is configured to be attached to a base 21 via fasteners such as 4 screws. It should be appreciated that in some embodiments, the base is configured such that the column 30 can swivel such that the orientation of the monitor mount and the keyboard tray can be changed. The column 30 also includes a movement coupling mechanism 100 (FIG. 4), a counter balance mechanism 60 (FIG. 4), and a locking mechanism.

Referring now to FIGS. 1A and 1B, the keyboard tray 22 is attached to the column 30 by means of a keyboard tray arm 23. An auxiliary tray 26 is configured to provide a work surface that can be positioned over a keyboard 12 and thus over the keyboard tray 22. In this regard, the auxiliary tray 26 is slidably attached to tray arm 23 via a pair of grooves 28 that are defined in tray arm 23 such that one of the grooves 28 is formed on one side of the tray arm 23 and the other groove of the pair of grooves 28 is formed on the other side of the tray arm 23. The auxiliary tray 26 is movable between a first position in which it is positioned between the keyboard tray 22 and the column 30 and a second position in which it is positioned at least partially over the keyboard tray 22.

Figure 4:
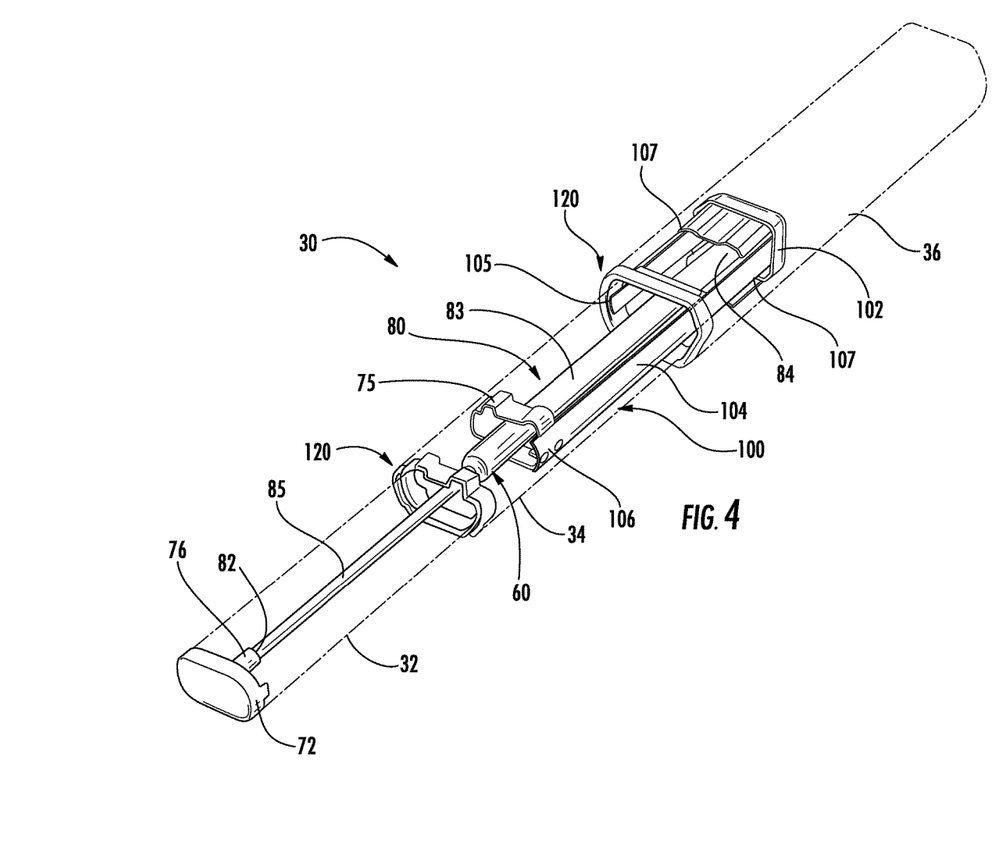
FIG. 4 shows a perspective view of interior detail of the extendable column of the workstation shown in FIG. 3.
Figure 5:
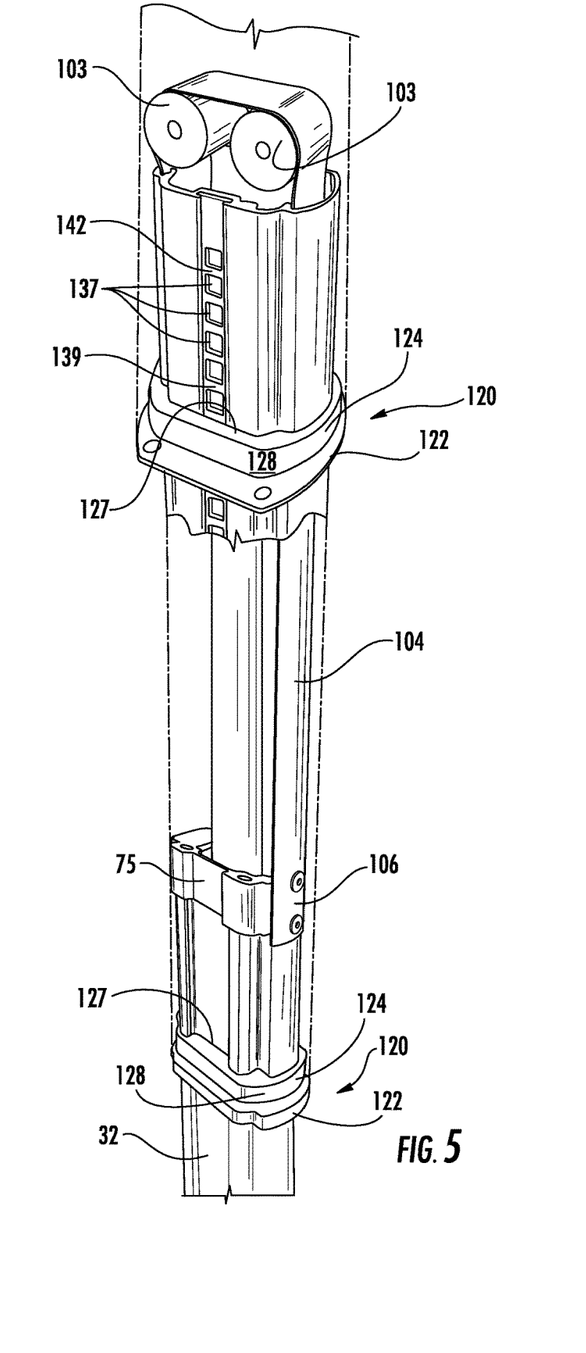
FIG. 5 shows a cutaway view of the extendable column shown in FIG. 3.

Referring now to FIGS. 3, 4, and 5, the first section 32 has one end capped by an inner cap 75 that is nested within the second section 34. The first section 32 has another end that is configured to receive a bottom cap 72. The bottom cap 72 includes a receptacle 76 configured to receive a first end 82 of a gas spring 80. According to the illustrated embodiment, the bottom cap 72 is made of metal.

The gas spring 80 is configured to extend from the bottom cap 72 through the first section 32 and into the second section 34 to a second end 84. The gas spring 80 is configured to be received by a roller end cap 102 that is positioned at an end of the second section 34. The gas spring 80 includes a body 83 and a rod 85 that extends from the body 83 to the bottom cap 72 of the first section 32. The body 83 of the gas spring 80 contains a gas that is under pressure such that the rod 85 is biased to be extended from the body of the gas spring 80. The gas spring 80 is configured to counterbalance downward force exerted on column 30 by monitor 16 and keyboard tray 22.

As shown in FIG. 5, the movement coupling mechanism 100 includes the roller end cap 102 and a spring steel strap 104. The roller end cap 102 is positioned at the nested end of the second section 34 that extends into the third section 36. The roller end cap 102 includes two rollers 103 that are configured to receive the strap 104 such that the strap 104 can move over the rollers 103. The spring steel strap 104 has a first strap end 106 connected to the inner cap 75 of the first section 32, i.e., the first strap end 106 is connected to the end of the first section 32 that is nested within the second section 34. A second end 105 of the strap 104 is connected to the lower end of the third section 36 that receives the nested end of the second section 34. The strap 104 travels through grooves 107 defined in the third section 36.

The strap 104 is configured to operate such that motion of the first section 32 relative to the second section 34 is mirrored by motion of the third section 36 relative to the second section 34. In this regard, when column 30 is lengthened, the first section 32 is moved away from the second section 34 and the third section 36 is caused to be moved away from the second section 34 by the strap 104. Likewise, when column 30 is shortened, the third section 36 is moved toward the second section 34 and the first section 32 is caused to move toward the second section 34 by the strap 104.

In the illustrated embodiment, column 30 is configured to be about 20 inches tall when all three sections 32, 34, and 36 are nested together as much as possible and the gas spring 80 is compressed. According to the illustrated embodiment, when the gas spring 80 is extended and all three sections 32, 34, and 36 are nested as little as possible the total height of column 30 is about 37 inches. In this manner, the amount of extension of column 30 that is possible is maximized relative to the amount of overlap in nested sections. It should be appreciated that in other embodiments, the minimum height of the column 30 and the maximum height of the column 30 can be different than that associated with the illustrated embodiment as these heights are dependent upon the number of sections and the height of each section.

Continuing to refer to FIG. 5, the three column sections 32, 34, and 36 define two interface regions where nested sections come together. A guidance component 120 is positioned on the lower ends of the second section 34 and the third section 36 at a respective interface region. Each guidance component 120 includes a flange 122 that extends away from a wall 124. The flange 122 of each guidance component 120 is configured to extend across the end of the respective section 34 and 36. The wall 124 is configured to extend into an associated space defined between the nested sections 32, 34, 36. The guidance components 120 are configured to be retained within their respective sections 32, 34, 36. In one embodiment, guidance components 120 are configured to be retained within their respective sections by friction. In another embodiment, the guidance components 120 are configured to snap into the respective section. In this embodiment the sections have a tab, slot or other component that does not prevent insertion of the guidance component within the respective section but does resist extraction of the guidance component 120.

Each guidance component 120 is configured to facilitate smooth movement of two nested sections relative to each other. When two sections are nested together, one section has a portion that extends into a portion of another section. In the illustrated embodiment, the first section 32 is nested within the second section 34 and the second section 34 is nested within the third section 36. In this regard, the third section 36 is an outer section relative to the second section 34 and the second section 34 is an outer section relative to the first section 32. Each guidance component 120 is generally tubular and includes an inner bearing surface 127, an outer bearing surface 128. The inner bearing surface 127 and is configured to contact the outer surface of the inner section of a pair of nested sections pair of nested sections. The outer bearing surface 128 is configured to contact an inner surface of the outer section of a pair of nested sections. The flange of a guidance component 120 extends over the end of the associated outer section.

Referring now to FIGS. 5-8, the locking mechanism is configured to both provide for relative motion of the sections 32, 34, and 36 of column 30 and to fix the relative positions of the sections 32, 34, and 36 of column 30. Thus, the height of the total column 30 can be fixed and as a result, the position of the keyboard 12 and monitor 16 can be fixed. The locking mechanism includes a rack 142 and an actuator 144. The actuator 144 includes a movable pin 146 and a mechanism, such as a lever 148, configured to transfer motion from a user to the pin 146.

As shown in FIG. 5, the rack 142 is defined directly in or, alternatively, can be positioned on the second section 34. The rack 142 includes a series of pockets or indentations 137. According to one embodiment, the indentations 137 are defined directly in the second section 34. According to another embodiment, indentations 137 are defined at least in part by a perforated strip 139 that is attached to the extruded tubular component of the second section. The indentations 137 are configured to receive the pin 146 of the actuator 144.

The actuator 144 is attached to the third section 36 and will be discussed further below. The pin 146 is movable between a first position in which it is engaged with an indentation 137 in the rack 142, which is positioned on the second section 34, and a second position in which the pin 146 is clear of the rack 142. When the pin 146 is in the second position, the rack 142, and thus the second section 34, is movable relative to the pin 146. It should be appreciated that when the pin 146 is engaged with an indentation 137 in the rack 142, the third section 36 and the second section 34 cannot move relative to each other. And, as will be discussed further below, the first section 32 is also fixed relative to the third section 36 when the pin 146 is engaged with an indentation 137 in the rack 142. In this manner, the length of column 30 and thus the height of the keyboard 12 and the monitor 16 are fixed relative to the base 21.

Figure 7:
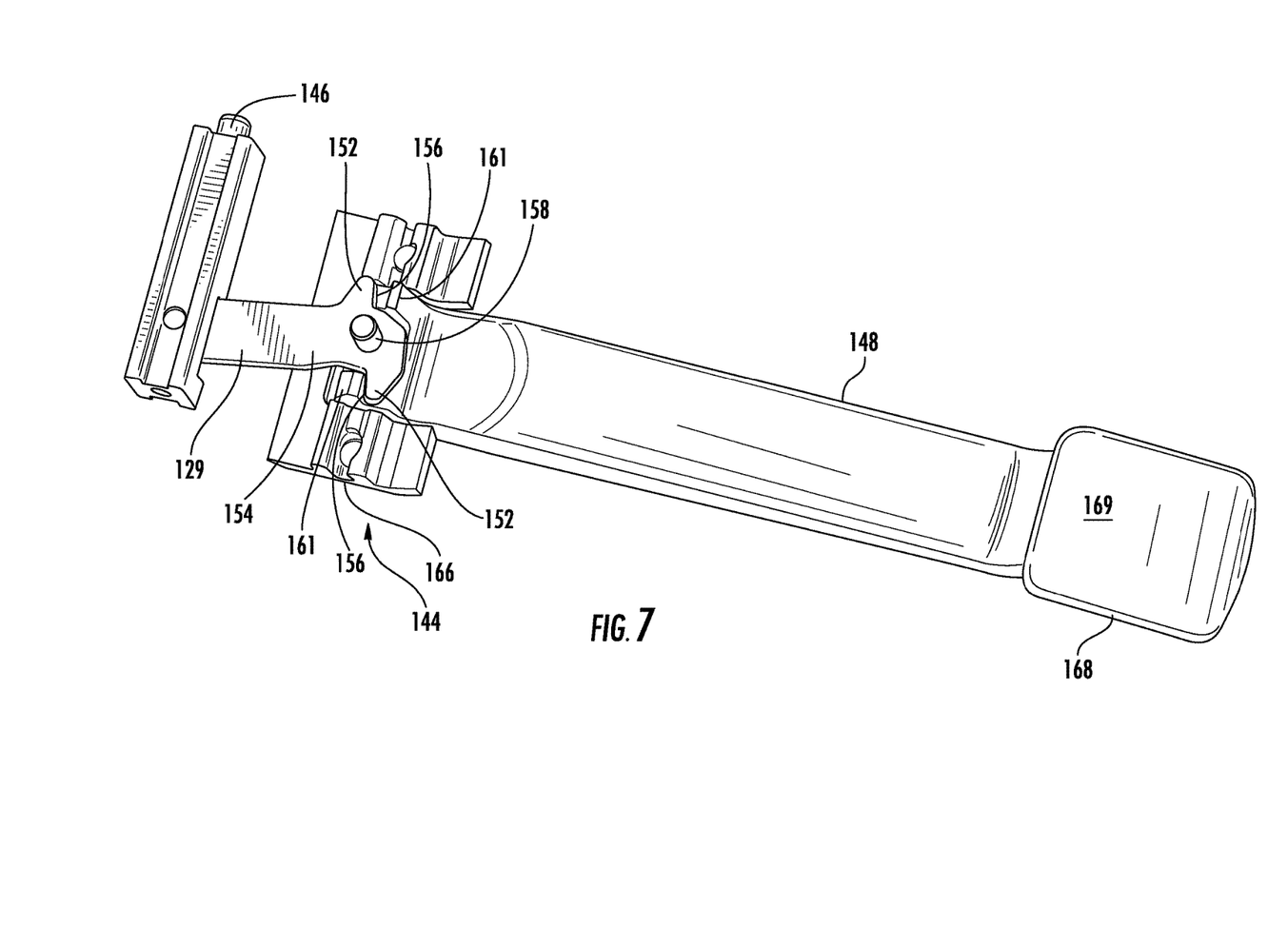
FIG. 7 shows a perspective view of a locking mechanism.
Figure 8:
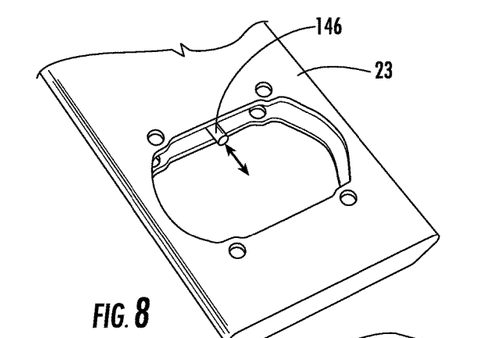
FIG. 8 shows a portion of the locking mechanism shown in FIG. 7.

As shown in FIG. 7, the actuator 144 includes a lever 148 and a linkage 129 that extends into keyboard tray arm 23. The linkage 129 is movably connected at one end to the pin 146. The linkage 129 includes two ears 152 that are spaced away from the connection to the pin 146 and that extend away from a body 154 of the linkage 129. Each ear 152 defines a contacting surface 156 that is positioned in a direction opposite than that of the contacting surface 156 of the other ear 152. The linkage 129 is configured to pivot about an axis defined by a post 158 positioned between the ears 152. In the illustrated embodiment, the contacting surfaces 156 of the ears 152 are configured to be positioned near corresponding tabs 161 of the lever 148 when the lever 148 is in the neutral position. The linkage 129 is configured to move in a plane that is substantially perpendicular to the plane in which the lever 148 moves. Movement of the lever 148 causes a tab 161 to be engaged with the corresponding contacting surface defined by an ear 152 of the linkage 129.

The lever 148 is configured to move about a joint 166 positioned near column 30. The lever 148 is configured to be biased to a neutral position in which the pin 146 is engaged in the rack 142. The lever 148 is also configured to move from the neutral position to either of two actuating positions. When the lever 148 is in either of the actuating positions, the pin 146 is disengaged from the rack 142. The lever includes a paddle 168 positioned away from the joint 166. The paddle 168 is configured to provide a surface 169 for easy contact by a user during movement of the lever 148. Stated another way, the lever 148 is configured to rotate about the joint 166 such that the third section 36 of column 30 can be moved up or down when the paddle 168 moves up. Likewise, when the paddle 168 moves down, the third section 36 of the column 30 can be moved up or down.

It should be appreciated that with the configuration of the actuator 144 as described above, an upward motion by a user can act to both release the pin 146 from the rack 142 and to move the third section 36 of column 30 upward. A downward motion by a user can act to both release the pin 146 from the rack and to move the third section 36 of column 30 downward. In this manner a user can shorten or lengthen column 30 in a single movement.

Figure 6:
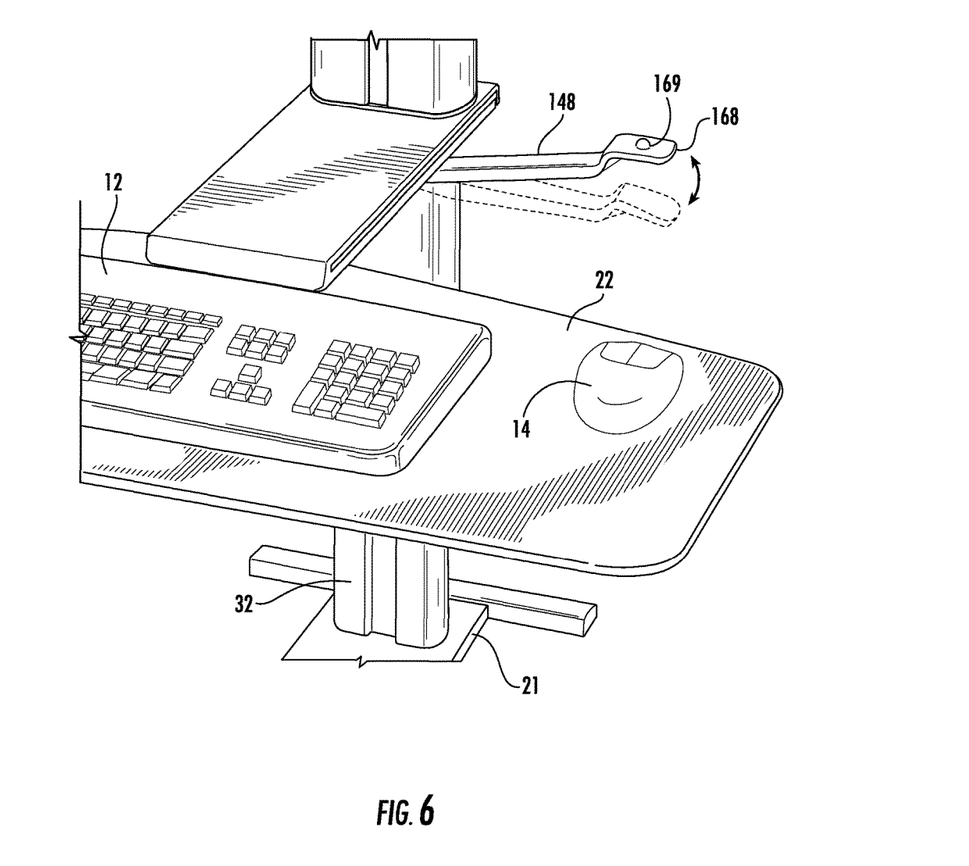
FIG. 6 shows a close up view of a portion of an adjustable workstation according to one embodiment of the present invention.

Referring now to FIGS. 1, 2, and 6, column 30 is configured to support a keyboard 12 on a keyboard tray 22 and a monitor 16 on the monitor bracket 24. In the illustrated embodiment, the relative positions of the monitor 16 and/or the keyboard 12 can be adjusted by relocating monitor bracket 24 along the third section 36. The monitor bracket 24 is attached to the third section 36 of the column 30 by a monitor mount 40 which is shown in detail in FIG. 9. The monitor mount 40 includes a body 42 that has two wings, or arms 44 extending from it on opposite sides of the body 42.

Figure 9:
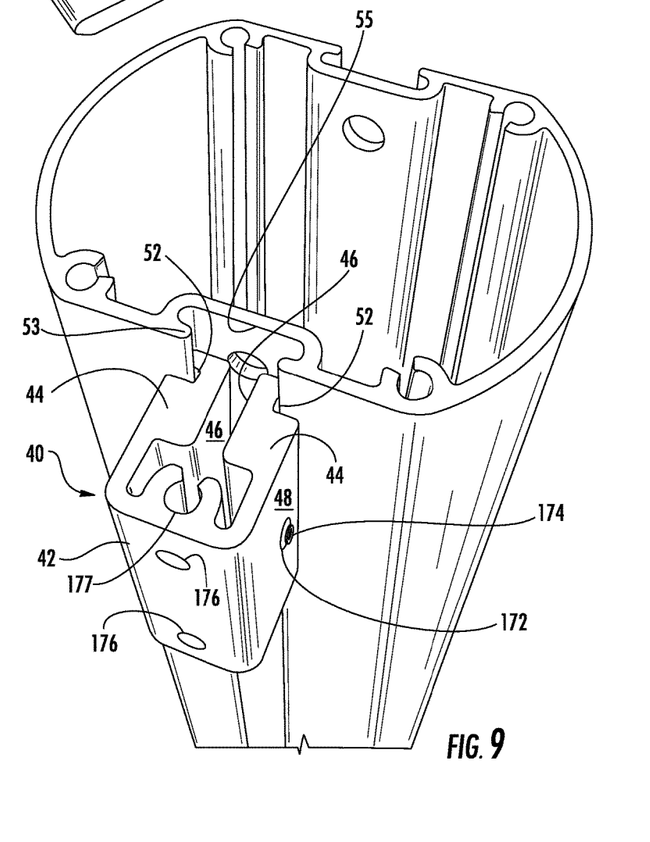
FIG. 9 shows a detailed view of a portion of an extendable column including a monitor mount.

The two arms 44 are substantially parallel and are spaced apart from each other. Each arm 44 has a first side 46 that is defined opposite the other arm. Each arm 44 has a second side 48 that is defined on the outside of the body 42 such that the second side is facing away from the opposing arm 44. In other embodiments the column 30 is configured to support more than one monitor.

Near the distal end of each arm 44 of the monitor mount 40 is a groove 52 that extends from the second side 48 into the respective arm 44. Each groove 52 is configured to receive a lip 53 of the track 55 in the third section 36. Thus the monitor mount 40 is configured to movably engage the lips 53 of the third section 36. A threaded hole 172 is defined in one of the arms 44 and is configured to receive a threaded screw 174. The threaded screw 174 can be engaged with the threaded hole 172 such that the screw 174 biases the arms 44 apart. In this manner the arms 44 can be spread to engage the lips 53 such that the monitor mount 40 is not movable relative to the track 55. A passageway 177 is configured to receive a bolt for attaching a monitor bracket 24. A pair of holes 176 are defined within the monitor mount to receive screws or bolts such that the monitor bracket 24 can be secured to the monitor mount 40.

Figure 10:
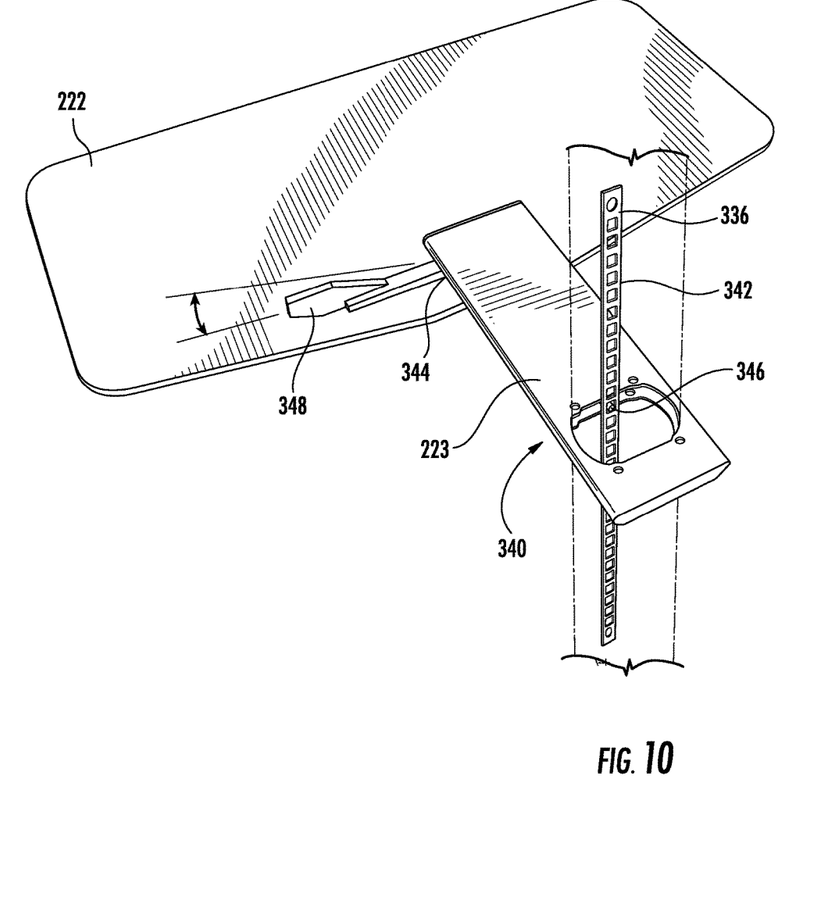
FIG. 10 shows a locking mechanism according to one embodiment of the present invention.

Referring to FIG. 10, there is shown an alternative embodiment that has elements that are associated with reference numbers in the 200 and 300 series. Unless otherwise indicated these elements can be understood by the description above of the elements in the 0 and 100 series having similar reference numbers that are offset by 200. In accordance with the alternative embodiment, the sit and stand combination desk includes an actuation system in which a lever 348 is positioned near the keyboard tray 222 and is configured to move between a locked position and an actuating position. Movement of the lever is in a plane just above and generally parallel to a plane defined by the surface of the keyboard tray 222. The lever is biased by a spring to return to the neutral locked position in which the plunger is engaged with the rack.

Figure 11:
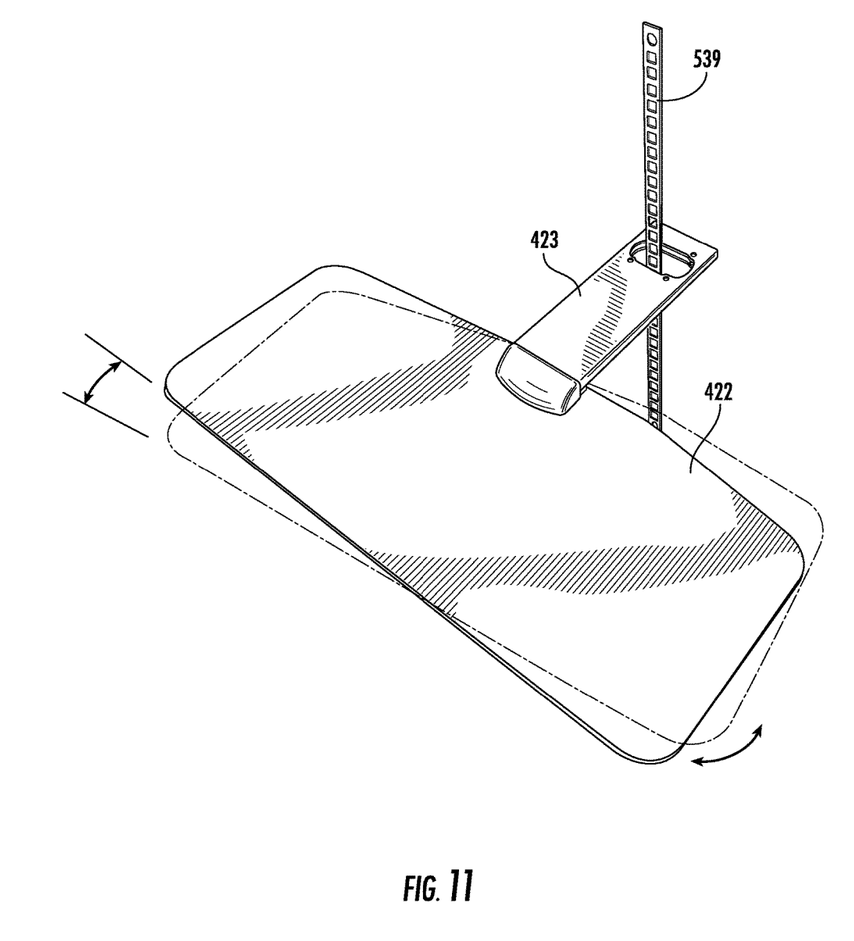
FIG. 11 shows a locking mechanism according to another embodiment of the present invention.

Referring to FIG. 11, there is shown another alternative embodiment that it has elements that are associated with reference numbers in the 400 and 500 series. Unless otherwise indicated these elements can be understood by the description above of the elements in the 0 and 100 series having similar reference numbers that are offset by 400. In accordance with another alternative embodiment, there is provided another actuating system which also includes a pin or plunger that is configured to engage a rack 539. The pin is connected by a linkage to the keyboard tray 422. The keyboard tray 422 is attached to the third section of the column by a keyboard tray arm 423. A linkage extends through the keyboard tray arm 423 to the pin. The keyboard tray 422 is movable between a neutral operating position and an activating position. When the keyboard tray 422 is in the neutral operating position the pin is engaged with the rack and the column cannot be extended or shortened. When the keyboard tray 422 is in the actuating position, the pin is not engaged with the rack the column can be extended or shortened. In this alternative embodiment, this keyboard tray 422 is configured to be moved between the neutral position and the actuating position by pivoting about an axis defined at the connection of the keyboard tray 422 to the keyboard tray 422 bracket.

While the present invention has been illustrated and described with reference to preferred embodiments thereof, it will be apparent to those skilled in the art that modifications can be made and the Invention can be practiced in other environments without departing from the spirit and scope of the invention, set forth in the accompanying claims.

Having described the invention, the following is claimed:

1. A workstation for alternatively configuring a conventional desk for use while sitting and use while standing, the workstation comprising:
    an extendable column that includes nested sections that are nested together such that the column can telescope and there is a first section, a second section, and a third section positioned such that the first section is received by the second section and the second section is received by the third section;
    a keyboard tray carried by the column and configured to support a keyboard; and
    a movement coupling mechanism that is configured to couple at least two of the sections such that when one of the coupled sections moves relative to the remaining section, the other coupled section moves relative to the remaining section; and
    wherein the movement coupling mechanism is configured to such that the first section and the third section are coupled;
    wherein the first section is configured to move between a first position and a second position relative to the second section such that when the first section is in the first position, the column is collapsed and when the first section is in the section position, the column is extended;
    wherein the third section is configured to move away from the first section when the first section moves from the first position to the second position;
    an arm carried by the column and configured to support the keyboard tray;
    a slidable work surface; and
    wherein the slidable work surface is attached to the arm via structured positioned on the arm and the slidable work surface is configured to move along the arm between a first position and a second position such that when the slidable work surface is in the second position, the slidable work surface is positioned over at least a portion of the keyboard tray.

2. A workstation configured to be converted between being positioned for use from a sitting position and for being for use from a standing position, the workstation comprising:
    an extendable column configured to receive a monitor, the column comprising:
        a first section;
        a second section configured to receive the first section; and
        a third section configured to receive the second section;
    a keyboard tray that is attached to the third section by an arm;
    an auxiliary tray that defines a work surface that is configured to move between a first position along grooves formed in the arm such that the work surface is near the column and a second position such that the work surface is at least partially over the keyboard tray;
    a strap that is connected at one end of the third section and at another end to a first section and configured to transfer motion from the first section and to the third section;
    a rack defined in the second section;
    a pin mechanically connected to the third section and configured to engage the rack;
    a lever mechanically linked to the pin; and wherein
    the lever is configured to move the pin from a position in which the pin is engaged with the rack and a position in which the pin is clear of the rack and when the pin is clear of the rack, the first and third sections can move relative to the second section.

3. The workstation according to claim 2, wherein the lever is a lever biased to a neutral position that is between a first position and a second position and wherein the pin is engaged with the rack when the lever is in the neutral position and the pin is clear of the rack when the lever is in either of the first position or the second position.

4. The workstation according to claim 3, wherein the column is configured to support the monitor via a monitor mount.

* * * * *